Nov. 2, 1943.  W. R. TUCKER  2,333,601
VERTICAL INJECTION PRESS
Filed April 22, 1940   8 Sheets-Sheet 2
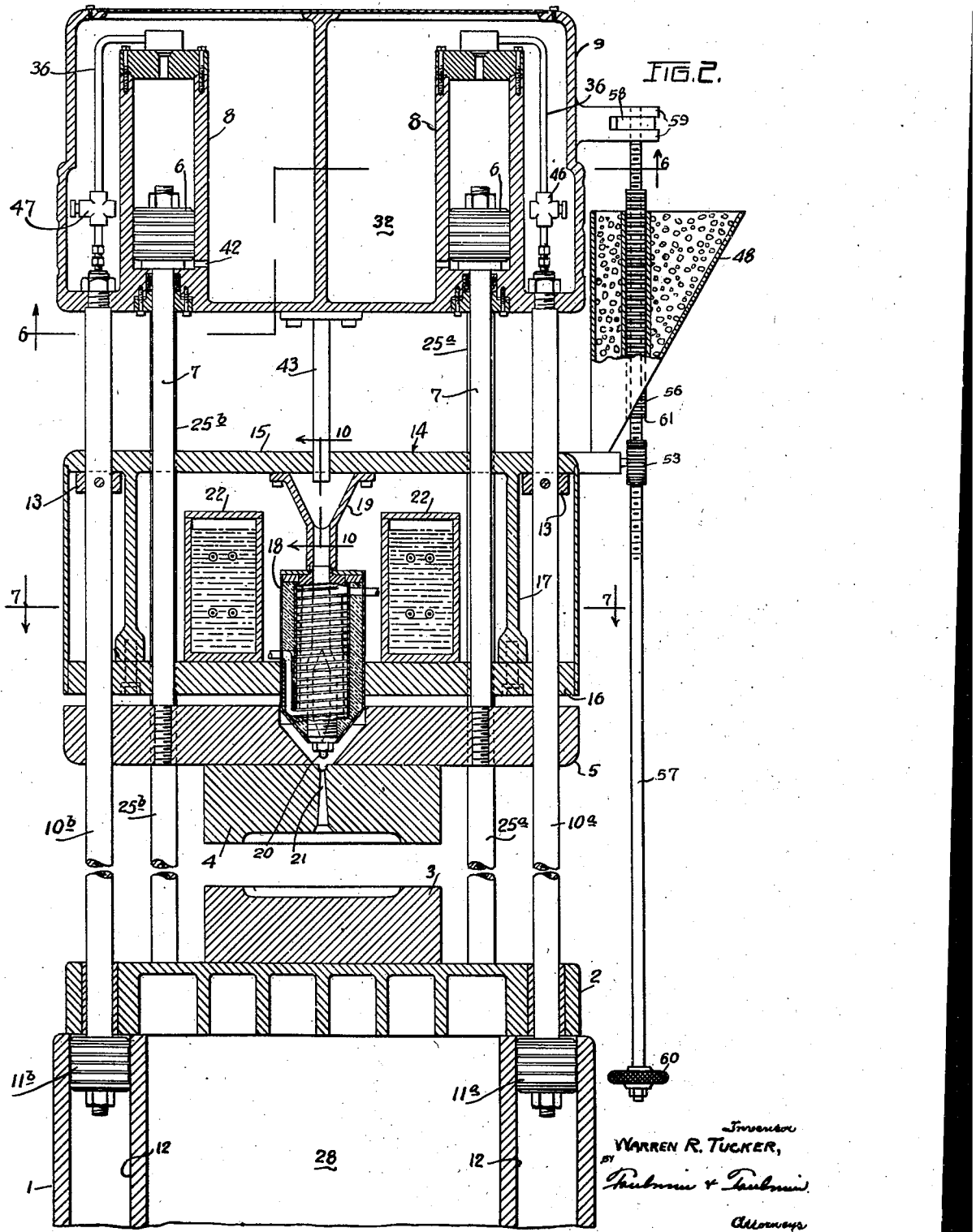

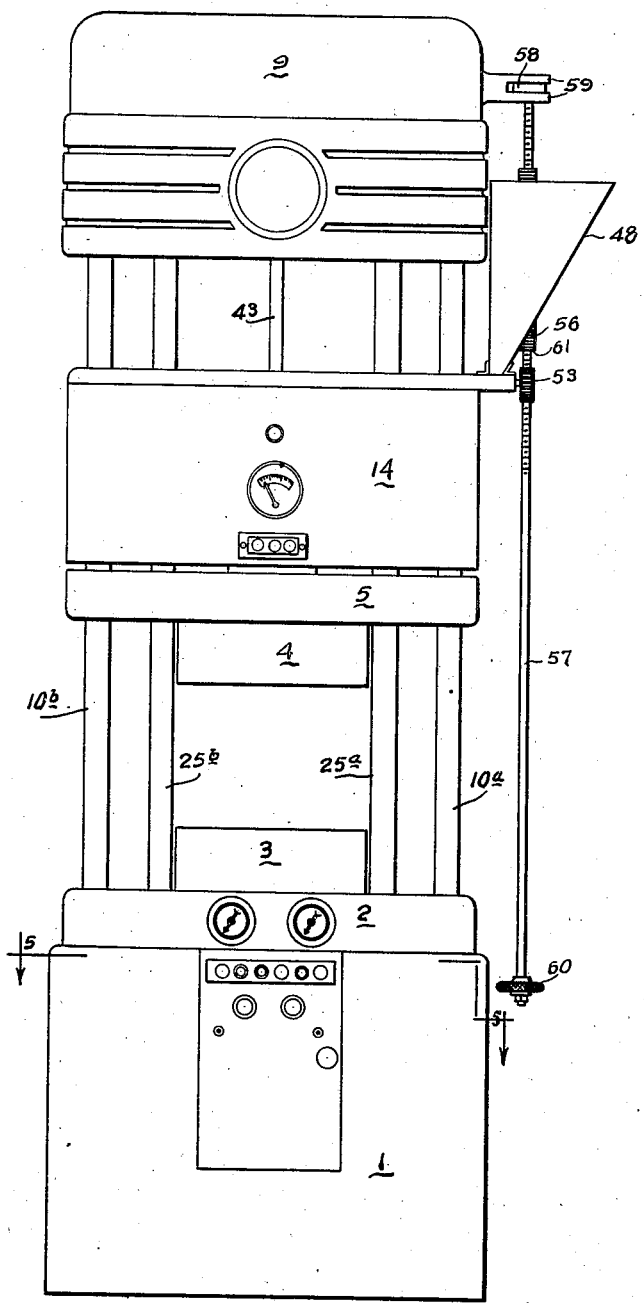

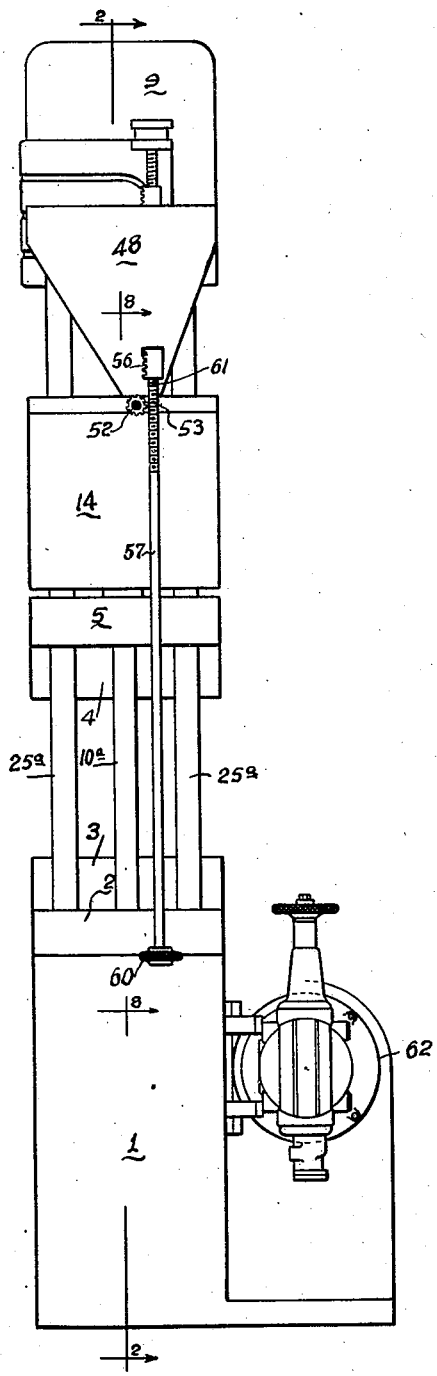
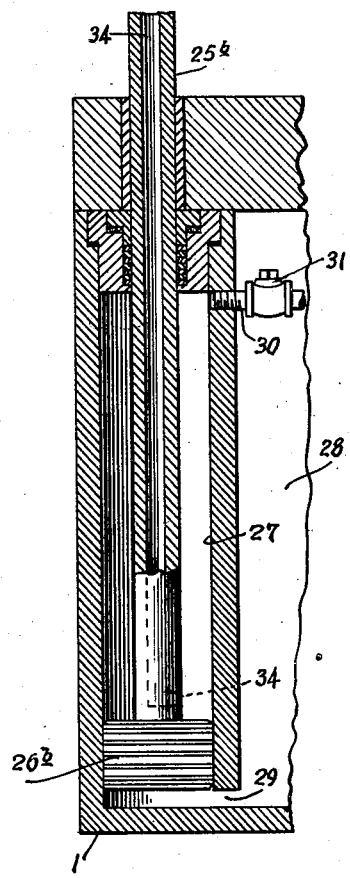

Nov. 2, 1943.   W. R. TUCKER   2,333,601
VERTICAL INJECTION PRESS
Filed April 22, 1940   8 Sheets-Sheet 5
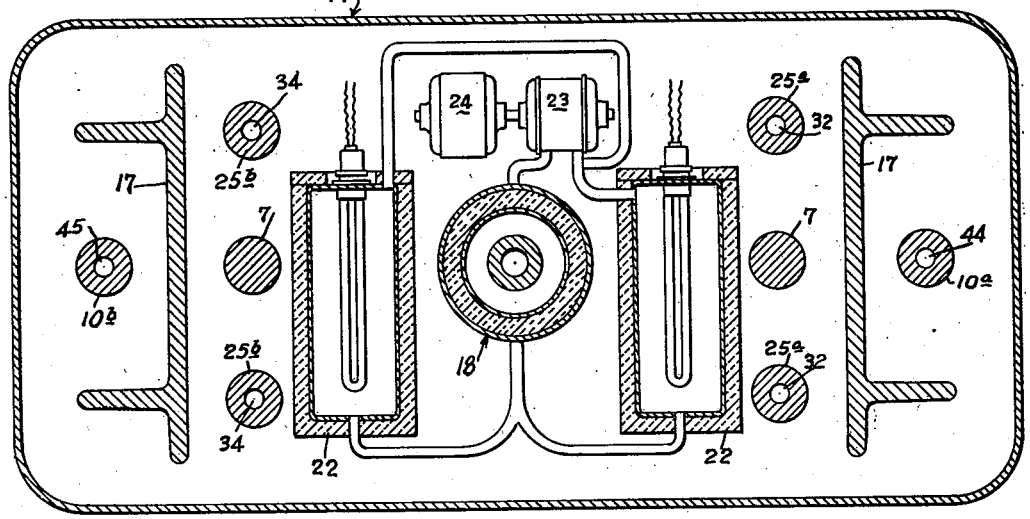
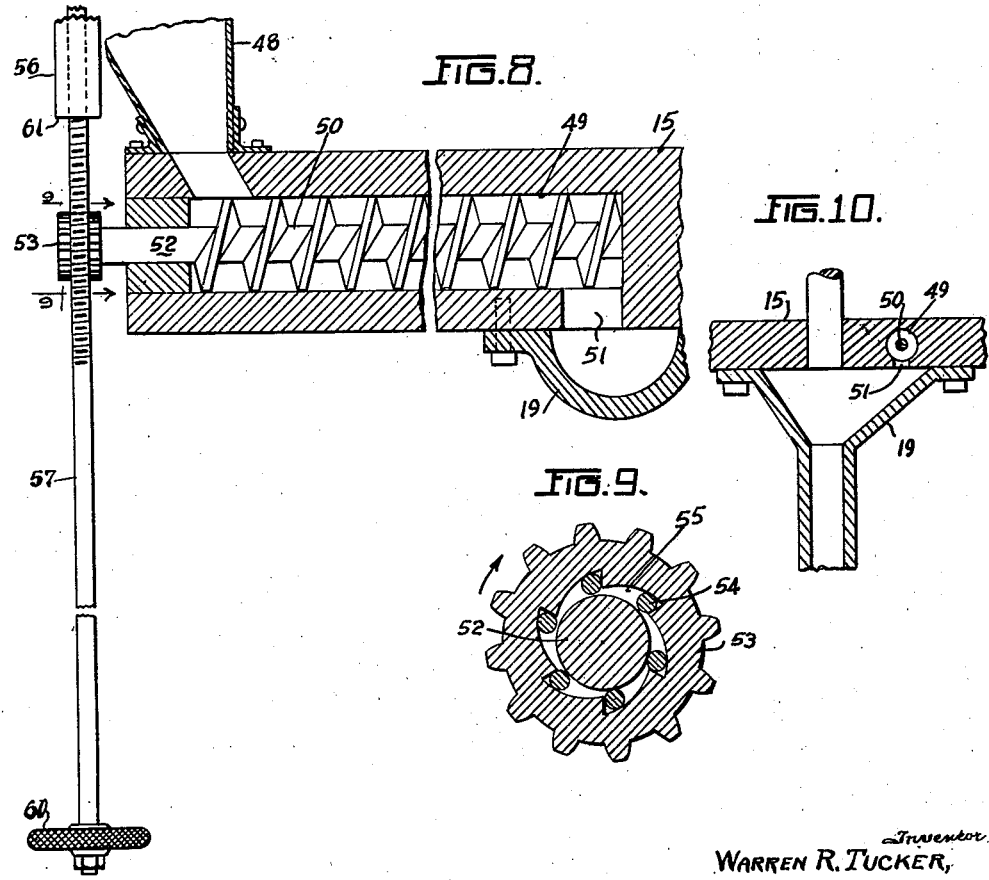
Inventor
WARREN R. TUCKER,
BY
Toulmin & Toulmin
Attorneys

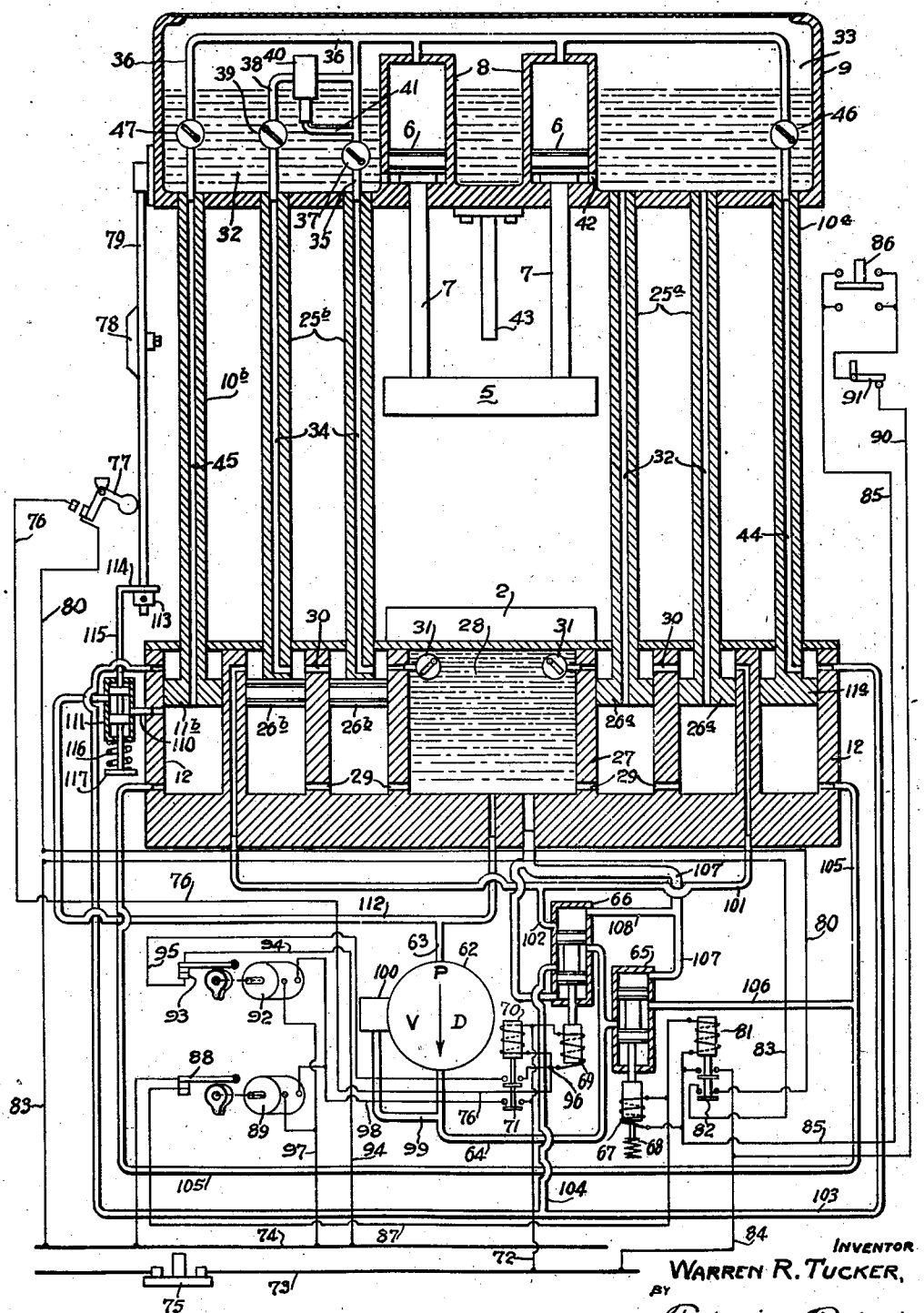

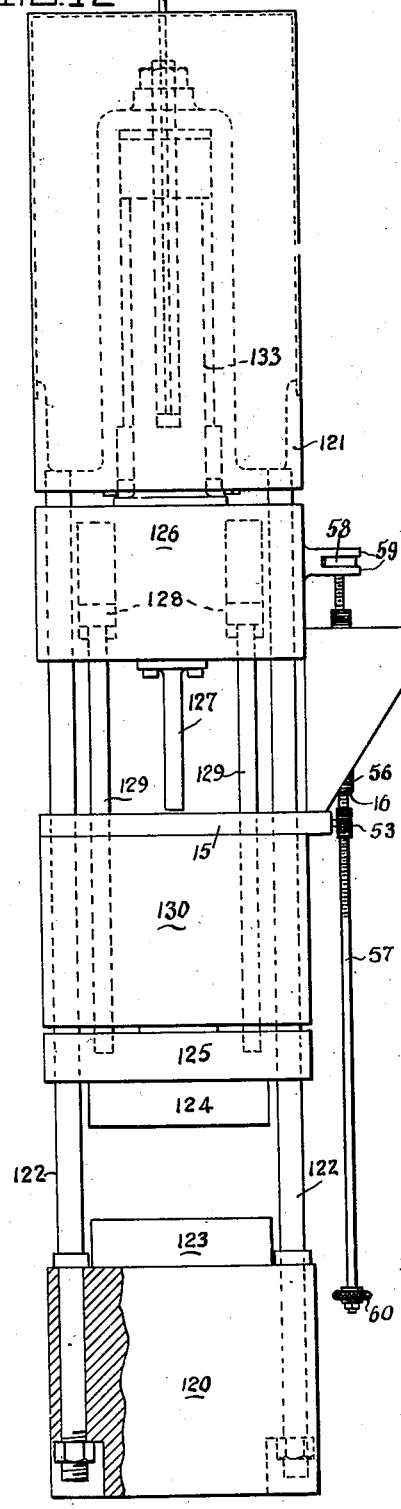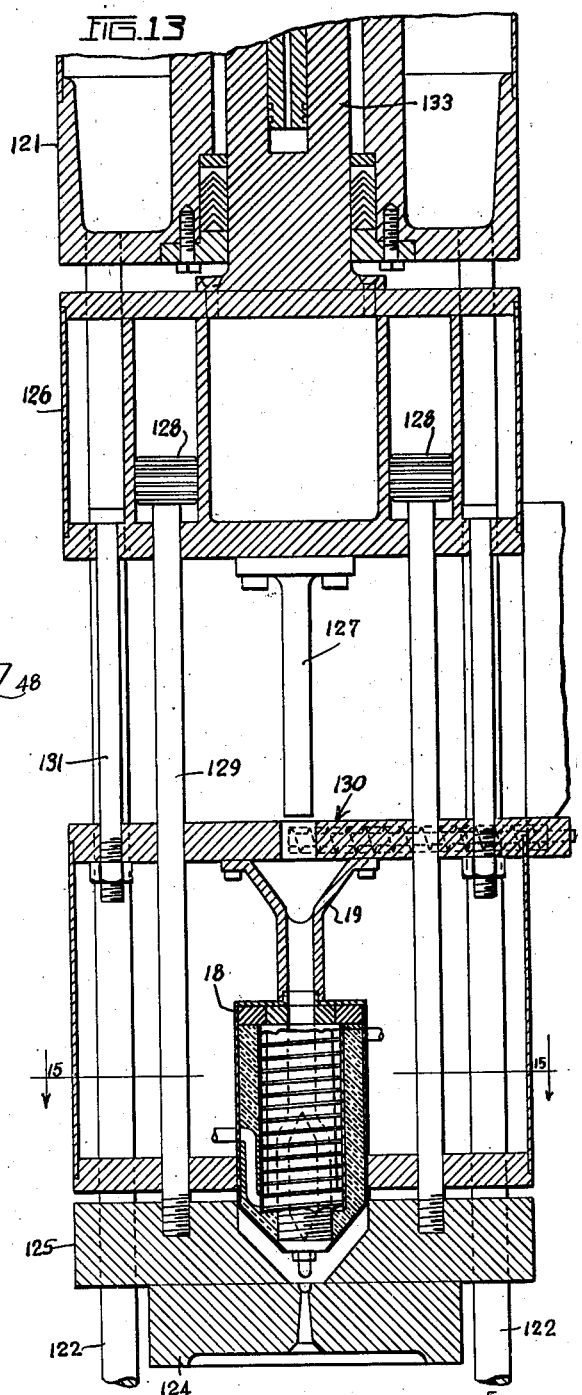

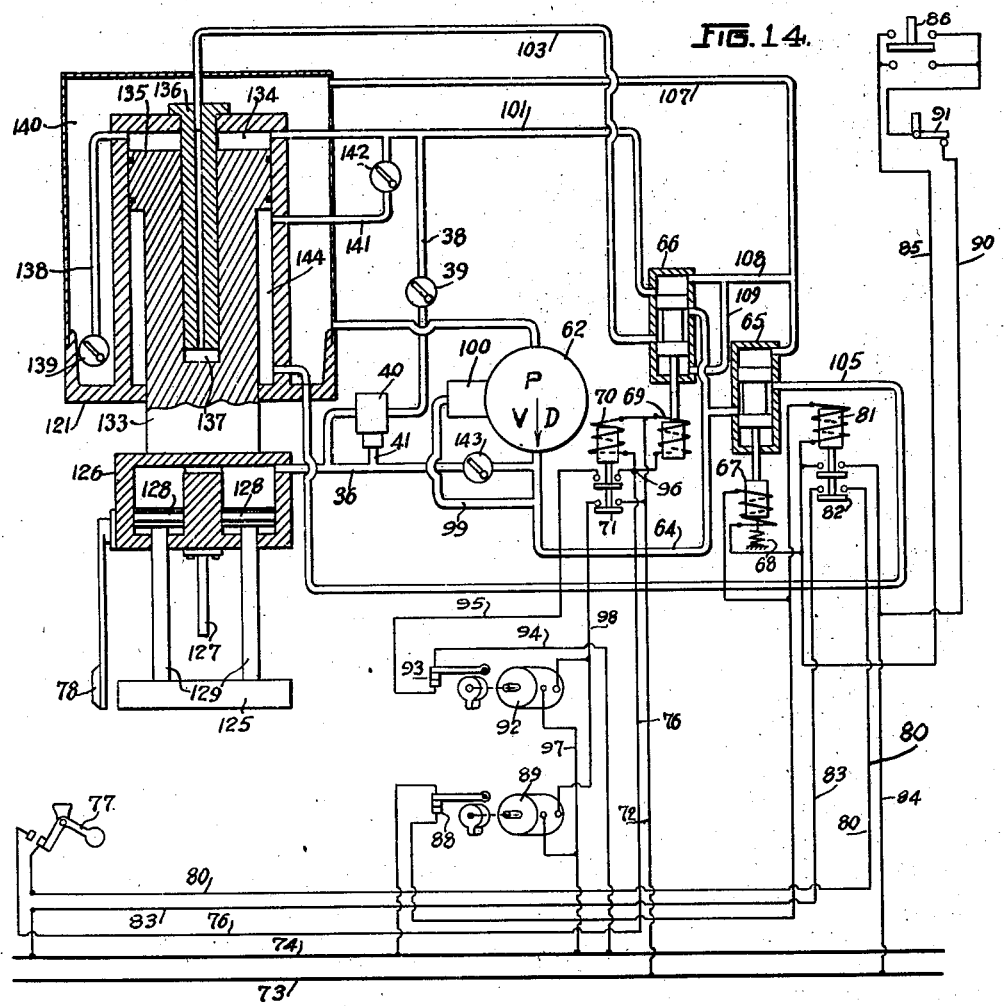

Patented Nov. 2, 1943

2,333,601

UNITED STATES PATENT OFFICE 2,333,601

VERTICAL INJECTION PRESS

Warren R. Tucker, Dayton, Ohio, assignor to The Hydraulic Development Corp. Inc., Wilmington, Del., a corporation of Delaware Application April 22, 1940, Serial No. 330,868

16 Claims. (Cl. 18—30)

This invention relates to an injection molding press and more particularly to a vertical injection press.

It is an object of the present invention to provide a vertical injection molding press which is more compact than injection molding presses heretofore devised and which occupies much less floor space than horizontal presses and much less head room than vertical presses heretofore available.

Another object is to still further decrease the head room required for the press by placing the main cylinders in the base of the press.

Another object is to provide for more effective clamping and injection and for more effective return of the injection plunger after the injection stroke.

Still another object is to provide a press of simplified construction and having simplified controls.

Another object is to provide an injection molding press having a fully automatic complete cycle of operation whereby it is unnecessary to manually manipulate the various parts of the press.

Still another object is to utilize advantageously hydraulic motors which are oppositely arranged and which have differential areas in such manner as to obtain improved and more flexible control of the press.

Another object is to obtain higher speeds of the moving parts of the press, for example to obtain a faster traverse preparatory to the injection stroke, a more rapid injection stroke than has been heretofore possible, and a more rapid return stroke.

Another object is to attain these advantages of higher speeds without using an accumulator which is expensive to install and to maintain. By the present invention a single hydraulic pump having an output which is limited as compared to the practically unlimited capacity of a hydraulic accumulator is directly connected to the hydraulic motors to be actuated, and the arrangement is such that new flexibility and greater speed are obtained.

Another object is to provide clamping and cushioning hydraulic motor means which are carried by the clamping and injecting head and which function in a new way towards a more advantageous result.

Another object is to provide for automatic dwell of the press at the end of the injection stroke, and after a portion of the return stroke, but before unclamping of the mold.

Another object is to provide feeding mechanism which accurately gauges the amount of plastic fed to the injection cylinder in direct proportion to the requirements of the injection cylinder whereby the injection plunger always stops at approximately the same position. In a preferred form, means is provided which is readily accessible to the operator adjacent the floor for adjusting the rate of feed and for changing the position at which the injection plunger stops in its stroke.

Still other objects will more fully hereinafter appear.

In the accompanying drawings:

Fig. 1 is a front elevation of a press embodying the principles of the present invention.

Fig. 2 is a vertical section taken on the line 2—2 of Fig. 3, looking in the direction of the arrows.

Fig. 3 is a right-hand side elevation of the press.

Fig. 4 is a detailed section on the line 4—4 of Fig. 5, looking in the direction of the arrows. This view shows in detail one of the main cylinders.

Fig. 7 is a horizontal section on the line 7—7 of Fig. 2, looking in the direction of the arrows.

Fig. 8 is a vertical section on the line 8—8 of Fig. 3. This view shows details of the automatically proportioning feeding mechanism.

Fig. 9 is a vertical section on the line 9—9 of Fig. 8 showing details of the one-way feeding sprocket.

Fig. 10 is a vertical section on the line 10—10 of Fig. 2, looking in the direction of the arrows, and shows in detail the feed chamber surrounding the injection plunger.

Fig. 11 is a diagrammatic view showing the press arrangement and showing the hydraulic and electrical circuits for the control thereof.

Figs. 12 to 15 portray a modified form of the invention in which the main ram is carried in the stationary head of the press and in which the push-back and the main ram are combined in a single double-acting differential hydraulic motor. In these views;

Fig. 12 is a front elevation of the modified form of the press.

Fig. 13 is a partial vertical section of the press of Fig. 12.

Fig. 14 is a diagrammatic view of this modified form of press and is similar to the diagrammatic view comprised in Fig. 11.

Fig. 15 is a horizontal section on the line 15—15 of Fig. 13, looking in the direction of the arrows and shows details of the heating chamber arrangement.

Figure 5:
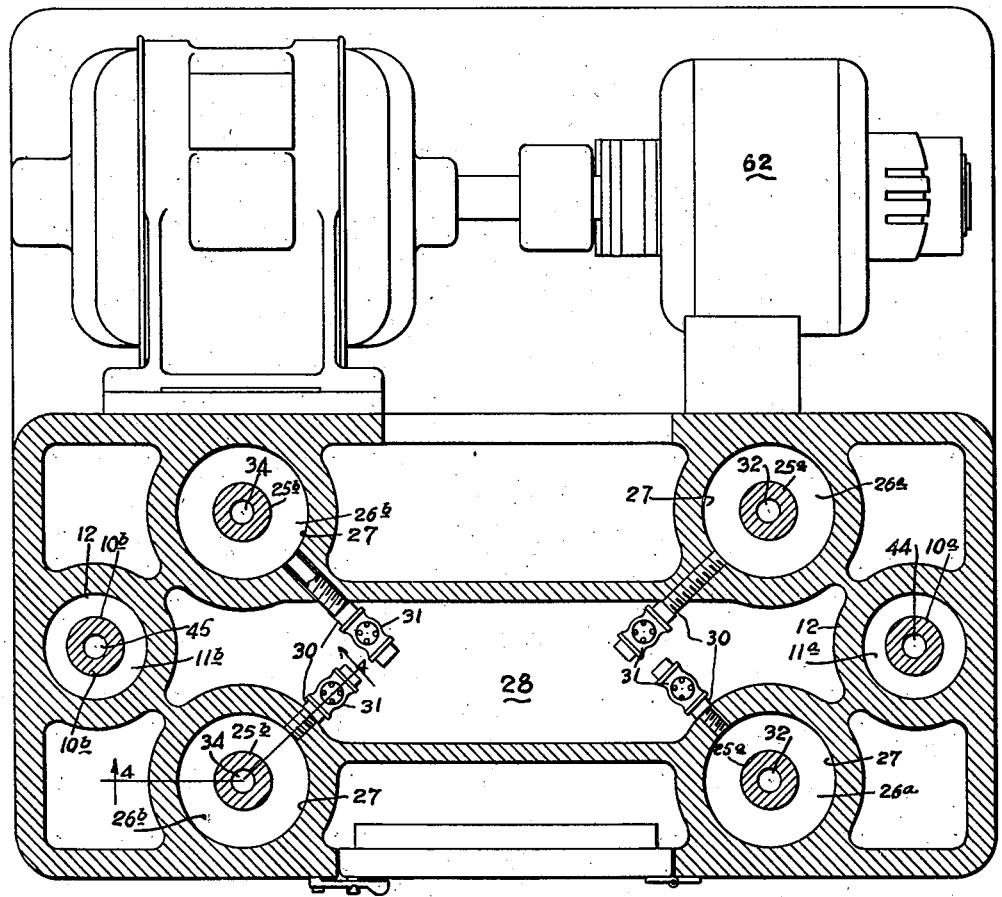
Fig. 5 is a horizontal section taken on the line 5—5 of Fig. 1, looking in the direction of the arrows.
Figure 6:
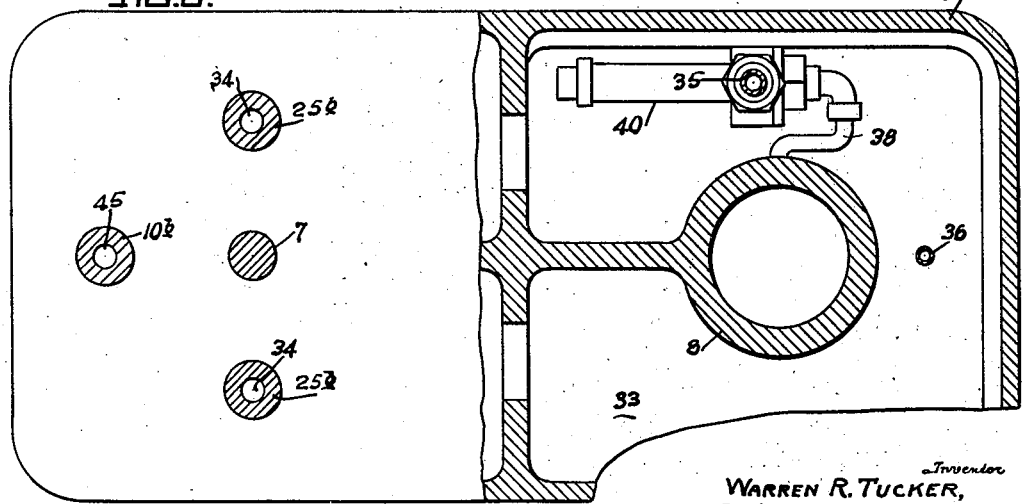
Fig. 6 is a horizontal section on the line 6—6 of Fig. 2, looking in the direction of the arrows.

Referring to the accompanying drawings in detail and first particularly to the form shown in Figs. 1 to 11, 1 designates the bed of the press upon which is fixedly mounted or held by gravity the lower bolster 2 carrying the lower mold half 3. The upper mold half 4 is carried by the upper bolster 5 which is operatively connected to the clamping and cushioning pistons 6 by clamping rods 7 which are attached in any suitable manner at their lower ends to the upper bolster 5. The pistons 6 are adapted to reciprocate within the clamping and cushioning cylinders 8 which are formed integrally with the clamping and injecting head 9 of the press, these cylinders 8 being formed within this clamping and injecting head 9 which is in the form of a hollow casting.

Depending from and fixedly attached at their upper ends in any suitable manner to the head 9 are a pair of rods 10a and 10b which function as both booster and push-back rods, having mounted fixedly at their lower ends the booster and push-back pistons 11a and 11b. These pistons 11a and 11b reciprocate within cylinders 12 formed in the bed 1, as for example by being made integral with the casting which constitutes the bed 1. The space above pistons 11a and 11b is employed for pulling the head 9 downwardly while the space below these pistons is employed to push the head 9 upwardly.

The rods 10a and 10b have mounted on them in any suitable manner collars 13 which support the injection cylinder carrying platen 14 so that platen 14 is free to traverse that portion of rods 10a and 10b which lies between the collars 13 and the head 9. Platen 14 is supported by gravity on the collars 13 when the press is in the position shown in the drawings. Platen 14 is made up of an upper plate 15 and a lower plate 16, these plates being secured together in spaced relationship by the webs 17 of plate 15 and suitable bolts passing through plate 16 into the webs 17.

Fixedly mounted on platen 14 is the injection cylinder designated generally as 18, this injection cylinder being attached to the upper plate 15 centrally thereof by means of the hopper 19 which forms the upper portion of the injection cylinder and which constitutes a feed chamber for holding a reserve of granular plastic in a manner which will presently appear. The injection cylinder 18 depends therefrom downwardly through the plate 16 which when the press is retracted is held a short distance above the upper bolster 5. The injection cylinder 18 is thus held initially a somewhat smaller distance from the bolster 5 so that when the platen 14 is lowered, the injection nozzle 20 will engage the injection gate 21 of the mold half 4 before the plate 16 rests upon the upper bolster 5.

Contained within the platen 14 are a pair of heating tanks 22 from which heated oil or the like is circulated through suitably oil heating passageways provided around the injection cylinder 18 in the usual manner, the pump 23 driven by motor 24 (Fig. 7) being employed for this purpose. The provision of the platen-contained heating means makes for a more compact and neater assembly.

Secured to and depending downwardly from head 9 in a manner similar to rods 10a and 10b are four main rods 25a and 25b which extend downwardly and slidably through the bolster 2 into the bed 1 of the press where they are provided with main pistons 26a and 26b which operate slidably within the vertical cylinders 27 formed integrally with the casting of the bed 1. The space above these pistons is employed as the main pressing area in a manner which will presently appear. The space below these pistons is in constant and free communication with a lower liquid tank 28 formed in the bed 1 of the press by the casting thereof. This communication is maintained by the ports 29 (Fig. 4) formed at the bottom of cylinders 27 on the side thereof adjacent the reservoir 28. The space above these pistons is in constant check-valved communication with the reservoir 28 by the conduits 30 which extend through the walls of cylinders 27 into the tank 28 and which are provided on their inward ends with check valve 31 which allow liquid to freely flow from the tank into these spaces but prevent the reverse flow.

The main rods 25a are provided with bores 32 (Fig. 11) which extend from their uppermost end down through the pistons 26a into communication with the spaces below pistons 26a. These bores 32 are also in free and constant communication with an oil reservoir 33 formed in the head 9 of the press. In this way, the reservoir 33 is in constant communication with the reservoir 28 and the reservoir 28 is always maintained full.

The main rods 25b are provided with bores 34 which are in communication at all times with the space above main pistons 26b, as is indicated in Fig. 11. One of these bores 34 is connected by a line 35 to a line 36 leading to the spaces above clamping pistons 6. A check valve 37 is disposed in this line 35 in such manner as to allow the free flow upwardly therein but to prevent the reverse flow. The other bore 34 is provided at its upper end with a pipe 38 which connects to the line 35 above the check valve 37. Pipe 38 is provided with a check valve 39 which allows liquid to freely flow downwardly but prevents the upward flow. Interposed in line 38 is a relief or unloading valve 40 which is adapted to be actuated by the pressure built up in line 35 transmitted through a line 41 from line 35 to actuate the valve 40 so as to allow free discharge from the space above clamping pistons 6 when the pressure thereabove exceeds a predetermined amount. The valve 40 is preferably made adjustable so as to allow for adjustment of the pressure at which unloading will take place and thus adjustment of the clamping pressure. As will be obvious, valve 40 is normally closed and is opened only after the mold halves are clamped under a predetermined pressure and allows the clamping and injecting head 9 to travel downwardly, causing the pistons 6 to be telescoped in the clamping cylinders 8. To allow relief of the underside of clamping pistons 6, the ports 42 are provided in the lower portions of clamping cylinders 8, these ports leading directly into the upper reservoir 33.

The clamping and injecting head 9 carries on its lower face the injection plunger 43 which is slidably received downwardly through a bore in the upper plate 15 of the injection cylinder carrying platen 14 and which is in alignment with the injection cylinder 18.

The right-hand booster and push-back rod 10a is provided with an axial bore 44 which communicates at its lower end with the space above booster and push-back piston 11a and which communicates at its top with the line 36 which is provided with a check valve 46 which allows liquid pressure from above the booster and push-back piston 11a to be transmitted to the clamping cylinders 8 but prevents the reverse flow of liquid. The left-hand booster and push-back rod 10b is provided with an axial bore 45 which extends downwardly through the booster and push-back piston 11b into communication with the space therebelow and which at its upper end is connected to the other end of line 36 which is provided with a check valve 47 which is adapted to allow liquid pressure from below piston 11b to be transmitted to the clamping cylinders 8 but to prevent the reverse flow of liquid. Thus, since one or more of the main pressing areas, the booster area and the push-back area is supplied with liquid pressure at all times, the clamping pistons are at all times supplied with liquid pressure.

Feeding mechanism

The feeding mechanism is portrayed in Figs. 1 to 3 and 8 to 10 and comprises a hopper 48 for granular material mounted on a right-hand extension of the upper plate 15 of the platen 14. This hopper 48 is adapted to feed granular material into the cylindrical bore 49 formed in the plate 15. A screw conveyor 50 is disposed in the bore 49 and is adapted to feed the material inwardly through a downwardly extending bore 51 into the feed chamber 19 which is disposed above and around the injection bore of the injection cylinder 18. Mounted on the outward end of the shaft 52 of the screw conveyor 50 is a drive pinion 53. Pinion 53 is adapted to drive shaft 52 in only one direction of rotation through the intermediary of the rollers 54 which are disposed in the tapering slots 55. The silent ratchet thus formed is adapted to drive feed screw 50 only when the pinion 53 is rotated in the direction indicated by the arrow in Fig. 9. Pinion 53 is adapted to idle when it is rotated in the reverse direction.

Adapted to drive feed pinion 53 is a rack 56 which is screw-threadedly mounted on an actuating and adjusting rod 57 mounted vertically on the right-hand side of the press. Rod 57 has at its upper end a fixedly attached collar 58 which is received rotatably between the ears 59 which are fixedly carried on the head 9 and which prevent rod 57 from moving vertically relative to head 9 but allow free rotation thereof. Thus the rack 56 may be adjusted vertically by rotating rod 57 by means of the hand wheel 60 at its lower end which is readily accessible to the operator. In order to adjust the point of stopping of the injection plunger 43, the rack 56 is adjusted vertically by means of the hand wheel 60. The adjustment is effective by changing the point at which the lower end 61 of the rack 56 engages the pinion 53 and starts rotation thereof on the downward stroke of head 9. Thus, if rack 56 is moved upwardly, its end 61 will not engage the pinion 53 until later and consequently feed screw 50 will be rotated a less amount as the head 9 moves downward in its injection stroke. It will be understood that while the arrangement is shown as feeding during the down-stroke of head 9, if desired it may be reversed so that feeding takes place during the upstroke.

From the foregoing, it will be seen that no feeding takes place while the head 9 and the platen 14 are moving downwardly together because when this is happening, there is no relative movement between the head 9 and the platen 14, but that feeding starts at the moment when the mold halves 3 and 4 are clamped when the head 9 moves downwardly while the platen 14 remains stationary. It will be seen further that the feeding will be in direct proportion to the extent to which injection plunger 43 is received within the injection cylinder 18. It will be understood that when the injection plunger 43 is retracted from the injection cylinder 18, the material which was fed into and which accumulated in chamber 19 around injection plunger 43 on the down-stroke will fall downwardly by gravity into the upper portion of the injection cylinder 18 so as to replace the material which was injected into the mold.

It will further be seen that by adjustment of the hand wheel 60 and consequent adjustment of the point of engagement of the rack 56 with the pinion 53, the point at which the injection plunger 43 comes to rest may be adjusted to suit the particular requirements of the article being molded. It is known that in order to obtain the best polish on the molded piece, the injection plunger 43 should stop at a point just ahead of the torpedo in the injection cylinder 18 and since the amount of material injected will vary with the size of the molded piece, it will be seen that by the feeding arrangement herein provided, conditions may be readily adjusted so as to bring about this desirable result with a piece of any size.

Hydraulic and electrical circuits

The hydraulic and electrical circuits are portrayed in Fig. 11. The liquid pressure for actuating the various hydraulic motors is supplied by means of a one-way variable delivery pump 62 which draws liquid from the tank 28 through the conduit 63 and supplies it under pressure to the conduit 64 which leads to inlet ports of control valves 65 and 66, valve 65 being a three-way valve and valve 66 being a four-way valve.

The electrical connections are as follows:

Valve 65 is provided with a solenoid 67 which when energized is adapted to pull the valve member thereof from the normal position shown in Fig. 11 downwardly against the action of spring 68, thereby shifting valve 65. The valve member of valve 66 is adapted to normally lie downwardly in the position shown in Fig. 11 and to be moved upwardly by the solenoid 69. Solenoid 69 is connected in parallel with a solenoid 70 which is adapted when energized to pull its armature 71 upwardly, thereby making two circuits which will be described presently. One side of the solenoids 69 and 70 is connected by a line 72 to the power line 73 which is provided with emergency switch 75 for discontinuing the application of power to the press. The other power line is designated as 74. The other side of solenoid 69 and 70 is connected by a line 76 to one side of a normally open limit switch 77 which is adapted to be actuated by a cam 78 adjustably carried on a rod 79 which is mounted on the head 9. Cam 78 is adapted to close limit switch 77 when clamping of the molds has taken place and when injection is about to begin. The other side of limit switch 79 is connected by a line 80 to a lower contact adapted to be engaged by the armature 82 of a solenoid 81 which is connected in parallel with solenoid 67. The corresponding lower contact is connected by a line 83 to the power line 74.

The upper contacts adapted to be connected by the armature 82 are connected as follows: One of them is connected by a line 84 to the power line 73. The corresponding upper contact is connected to a line 85 which is connected to one side of solenoids 67 and 81 and which is also connected to one side of a switch 86. The other side of solenoids 67 and 81 is connected by a line 87 through a normally closed time switch 88 to the power line 74. Switch 88 is adapted to be opened by a timer motor 89. The other side of the switch 86 is connected by a line 90 to the line 84 and thus to the power line 73. Interposed in the line 90 is a repeat limit switch 91. For automatic operation, the switch 86 is locked up against the upper contacts and the limit switch 91 which is closed only when the press head 9 is up and which is otherwise open, is adapted to be closed by the press head 9 reaching the limit of its upward travel, thereby causing press head 9 to execute another injection stroke. For manual operation, the switch 86 is pushed down for an instant against the lower pair of contacts and is then released.

Another timer motor 92 is provided which is adapted to open a normally closed time switch 93, one side of which is connected by a line 94 to the power line 74 and the other side of which is connected by a line 95 to an upper contact adapted to be connected by the upper switch blade carried by armature 71 to the point of juncture 96 of line 76 with the lower ends of the coils of solenoids 69 and 70. The timer motors 89 and 92 are connected in parallel, one side being connected by a line 97 to the power line 74 and the other side being connected by a line 98 to a contact adapted to be engaged by the lower switch blade carried by armature 71, the corresponding contact of which is connected to the line 72 leading to the power line 73.

The hydraulic connections are as follows:

A conduit 99 leads from the outlet conduit 64 of pump 62 to a servomotor 100 mounted operatively on the pump 62 whereby the pump is shifted towards neutral when a predetermined pressure is developed in conduit 64. This enables the holding of the injection plunger 43 inwardly under pressure at the end of the injection stroke.

The main pressing areas located above the main pistons 26a and 26b are connected to the branched conduit 101 which leads by the conduit 102 to the upper service port of valve 66. The booster areas above pistons 11a and 11b are connected to the conduit 103 which is connected by the conduit 104 to the other service port of valve 66. The push-back areas below pistons 11a and 11b are connected by conduits 105 to a conduit 106 to the service port of the other valve 65. The return port of valve 65 is connected by a return conduit 107 back to the tank 28. The upper return port of valve 66 is connected by a conduit 108 to this return conduit 107. The lower return port of valve 66 is connected by a conduit 109 to the return conduit 107. When valves 65 and 66 are in the position shown in the drawings, valve 65 supplies liquid pressure into the push-back areas below pistons 11a and 11b, while valve 66 supplies liquid pressure into the booster areas above these pistons. Since the push-back areas are greater than the booster areas, this causes the press head 9 to be held in its uppermost position. If the valve member in valve 65 is shifted downwardly, it cuts off the application of pressure to the push-back areas, allowing them to be connected to the tank 28. This causes the push-back pistons 11a and 11b to move downwardly under the influence of liquid pressure applied to the booster areas thereabove. Should the valve member in valve 66 be shifted upwardly to the limit of its upward travel by energizing of solenoid 69, the main areas above pistons 26a and 26b will be disconnected from the tank 28 and will be supplied with liquid pressure and at the same time the application of liquid pressure to the booster areas will be discontinued and these booster areas will be connected to the tank 28 by the return conduit 109.

In order to limit the upward travel of the press head 9, the left-hand push-back cylinder 12 is provided with an over-travel port 110 which is adapted to be connected by a two-way valve 111 to a conduit 112 which connects with the inlet conduit 63 of the pump 62 and thus to the tank 28. The rod 79 carried by the press head 9 is provided with an adjustable collar 113 which is adapted to engage an ear 114 on a rod 115 at the point where it is desired to have head 9 stopped. The rod 115 is connected integrally to the valve member of valve 111. A spring 116 is provided between the casing valve 111 and a shoulder 117 on a downward extension of rod 115 and is adapted to normally maintain the valve 111 closed but to yield to allow it to be opened when the head 9 regains its upper position. Thus it is insured that the head 9 will stop its upward movement at a predetermined point and yet the push-back function of the lower side of piston 11b is retained. Should the head 9 drift downwardly slightly, it would cause valve 111 to be closed, whereupon the pressure delivered into conduit 105 would be immediately applied to the push-back pistons 11a and 11b to cause upward travel of head 9 until valve 111 is opened.

*Operation*

When the press is idling, the parts are as shown in Figs. 1 to 11. The pump 62 is constantly delivering pressure liquid. The valve member of valve 66 is so disposed that the pressure liquid is directed to the booster spaces above pistons 11a and 11b. At the same time, the main pressing spaces above pistons 26a and 26b are connected freely to the tank 28 through the upper portion of valve 66. The valve 65 has its member so disposed that the pressure liquid is simultaneously delivered to the push-back spaces below pistons 11a and 11b. Since the push-back area is greater than the booster area, the head 9 is held up. The rod 79 mounted on head 9 has opened the valve 111, allowing the liquid delivered into the push-back spaces to be returned back to the tank 28, thereby holding the head 9 in its uppermost position. The output of the pump 62 is also being constantly delivered to the clamping and cushioning cylinders 8 by reason of the provision of the bore 44 leading to the booster spaces above piston 11a and the bore 45 leading to the spaces below piston 11b. This pressure maintains the pistons 6 bottomed in the cylinders 8.

To start head 9 downwardly in a pressing operation, the operator presses the switch 86 downwardly for an instant or locks it up for fully automatic repeat operation. This energizes solenoids 67 and 81, the upper repeat limit switch 91 being closed at this time. The energizing of solenoid 81 causes its upper blade to establish a holding circuit for maintaining the solenoids 67 and 81 energized until this holding circuit is broken. The energizing of solenoids 67 and 81 is possible because timing switch 88 is now closed, and the holding circuit is established from power line 72 through line 84 across the upper switch through the solenoids 67 and 81, through the line 87, through the timed switch 88 and back to the other power line 74. The energizing of solenoid 81 also establishes with its lower blade a connection between lines 80 and 83 such that when limit switch 77 is closed at the completion of clamping, it can cause energizing of solenoids 69 and 70 through the line 76, through the coils of solenoids 69 and 70, and through the line 72 back to the power line 73. At the same time, the electrical connection of lines 80 and 83 by the lower switch blade of solenoid 81 prepares the circuit for the energizing of solenoids 69 and 70 by the closing of limit switch 77 when the clamping has been completed.

The energization of solenoid 67 in the manner just described causes the valve member of valve 65 to be shifted downwardly so as to cut off the application of liquid pressure to the push-back areas below pistons 11a and 11b. The head 9 now moves downwardly at high speed under the action of liquid pressure applied to the booster areas, the total booster area being small so that fast traverse is obtained. As the head 9 moves downwardly, it carries the mold half 4 towards the mold half 3, the clamping pistons being supplied with liquid pressure through bore 44 of the rod 10a and projecting the mold half 4 downwardly to the maximum possible extent. After the head 9 reaches a certain point at which the clamping of the mold halves together under high pressure and the actual injection stroke are about to begin, or after the mold halves have been clamped under the desired pressure but before injection is actually begun, the cam 76 closes the limit switch 77. This causes solenoids 69 and 70 to be energized. The energization of solenoid 70 causes it to establish with its upper blade a holding circuit for holding solenoids 69 and 70 energized, this circuit being from power line 74 through line 94, through closed timed switch 93, through line 95, through the upper switch blade of solenoid 70, through solenoids 69 and 70 which are in parallel, to the line 72 back to the other power line 73. The energization of solenoid 70 causes its lower blade to establish a circuit through timing motors 89 and 92 which are connected in parallel, this circuit being from power line 73, through line 72, through the lower switch blade of armature 72, through line 96, through the motors 89 and 92, and through line 97 to the other power line 94.

The function of the initiation of the timing motors 89 and 92 will presently appear. It will be understood that these timing motors are so arranged as to open their switches after a predetermined time which may be variable at the will of the operator and that these motors are provided with suitable self-contained means for causing their return to the initial position.

The energization of solenoid 69 simultaneously with the energization of solenoid 70 causes the valve member in valve 66 to be pulled upwardly. This causes the application of the output of pump 62 into line 101 and thus to the top of the main pistons 26a and 26b, and simultaneously causes the discontinuance of the application of pressure liquid to the booster areas so as to obtain a fast injection stroke. If the limited output of pump 62 were applied to both the main and the booster areas, the injection would be slower. The head 9 continues downwardly under the action of the pressure liquid applied to the main pressing spaces, the application of pressure to the clamping piston 6 being maintained by the bore 34 in the right-hand main rod 25b. As the head 9 continues downward in this manner, the clamping and cushioning pistons 6 remain stationary, clamping having been accomplished to the desired extent. The clamping and injecting head 9 continues beyond the clamping pistons 9, causing discharge of liquid from the clamping cylinders 8 through the relief or unloading valve 40 downwardly through the check valve 39 and the bore 34 of the left-hand main rod 25b into the spaces above the main pistons 26a and 26b, these spaces all being in communication with one another by means of the conduit 101. This continued movement of the head also causes entry of the injection plunger into the injection cylinder, causing first a firm clamping of the injection cylinder to the upper mold half 4 and thereafter causing actual injection. The discharge of liquid from the clamping cylinders 8 into the main pressing spaces gives a much more rapid injection stroke by lowering the effective area of the main pressing pistons 26a and 26b by an amount equal to the area of the clamping pistons 6.

The press maintains the pressing condition until timing motor 89 opens the timed switch 88, whereupon solenoids 81 and 67 are de-energized since the application of power to line 87 from power line 74 has been interrupted. The de-energization of solenoid 81 prepares this solenoid for the next cycle. The de-energization of solenoid 67 causes the valve member of valve 65 which was pulled downwardly to be returned upwardly to its original position shown in Fig. 11 under the influence of spring 68. This causes the output of pump 62 to be applied to the line 105 and thus to the push-back areas below push-back pistons 11a and 11b. This causes the head 9 to be retracted because the areas of the clamping pistons 6 added to the areas of the push-back pistons 11a and 11b exceed the main pressing area. Since the pistons 6 are now telescoped in their cylinders 8, the pressure applied to the push-back spaces is also applied to the clamping cylinders by way of the bore 45 in the rod 10b and is therefore effective to aid in raising the clamping cylinders 8 upwardly with respect to the clamping pistons 6 and to thus act in conjunction with the push-back pistons to overcome the main pressing pistons and cause return of the head 9 upwardly.

It will be understood that the length of time between the starting of timing motor 89 and the opening of its switch 88 is gauged so as to allow for the completion of the injection stroke and the holding of the injection plunger 43 under injection pressure so as to allow the article in the mold to be properly formed.

The press continues in the condition just described, the retraction of the head 9 continuing until the clamping pistons 6 bottom in the head 9. When that happens, retraction of the injection plunger ceases because when the pistons 6 bottom, their area is removed from cooperation with the push-back area and the area of the main pressing pistons is greater than the area of the push-back. Any tendency for the main pressing pistons to force the head 9 down is, however, instantly counteracted since it unbottoms the clamping pistons 6, rendering their areas effective in conjunction with the push-back area to cause upward movement of the head 9 until the pistons 6 bottom. Therefore, the head 9 merely stops in its upward movement and maintains this position because if it moves in either direction from this position, it is instantly returned to it. Meanwhile, the mold halves have remained clamped under the predetermined pressure and cooling of the molded article is taking place.

The press maintains this state until the timing motor 92 causes opening of the timed switch 93 after a predetermined time sufficient to allow cooling and hardening of the molded article. The opening of switch 93 causes solenoids 69 and 70 to be de-energized. De-energization of solenoid 70 merely placed it in condition for another cycle. De-energization of solenoid 69 causes the valve member in valve 66 to fall by gravity to the position shown in Fig. 11, causing the application of liquid pressure to the booster areas by means of conduits 103 and causing the main pressing areas to be freely connected back to the tank 28. This causes the head 9 to begin to rise and to complete its return stroke because the area of push-back exceeds the booster area. By connecting both the booster and the push-back to the same limited source of liquid pressure, the liquid forced out of the booster spaces enters the push-back spaces and causes a very rapid return stroke from this point.

While the first part of the return until the time of unclamping the mold is relatively slow, this is immaterial because at this point the time required for the cooling and hardening of the article in the mold is the limiting factor and there is still ample time for the first part of the retraction before the timing motor 92 opens the switch 93.

The return of the head 9 continues until the piston 11b uncovers the over-travel port 110 and the ear 113 carried by the head 9 causes opening of the valve 111, allowing the pump output to be returned to the tank. At this time, the application of clamping pressure to clamping piston 6 may be discontinued because of slight leakage by piston 6, but this is not material because clamping is not essential. This is the only time in the cycle when there is any possibility of the clamping pressure being released and in fact this is not during the cycle but is at the completion of the cycle during dwell at the uppermost position.

If the switch 86 is locked, the action of the press in returning to the upward position causes opening of limit switch 91, thus causing repetition of the cycle.

As the head 9 and the platen 14 move downwardly together, no feeding occurs. However, when platen 14 comes to rest by reason of the engagement of the injection nozzle 20 with the mold half 4, continued movement of the head 9 downwardly causes the rack 56 after a predetermined period, depending upon the adjustment of the vertical rod 57, to engage the pinion 53 and cause rotation thereof in a direction clockwise of Fig. 9. This causes feeding by the feed screw 50 into the chamber 19 proportionately to the extent of travel of injection plunger 43 downwardly. As the injection plunger is withdrawn, the overrunning clutch embodied in pinion 53 does not feed. As the injection plunger is withdrawn, the accumulated granular material in the chamber 19 falls downwardly into the top of the heating chamber.

Modification of Figures 12 to 15

In Figs. 12 to 15, there is disposed a modified form of the invention in which the clamping and injecting head is moved hydraulically by hydraulic motors located thereabove instead of having the main hydraulic motors, the boosters and the push-backs in the bed of the press. In these views, the bed of the press is designated 120, and is connected to the stationary head 121 of the press by the strain rods 122. The lower mold half 123 is mounted on the bed 120 while the upper mold half 124 is mounted on the bolster 125. The clamping and injecting head 126 carries the plunger 127 and contains the clamping pistons 128 which support the upper mold half 124 by the rods 129. The injection cylinder carrying platen 130 is constructed in a manner generally similar to that described above and is suspended in a similar manner from the clamping and injecting head by the rods 131. The oil heating chamber 132 is mounted on the lower plate of the platen 130 on a rearward extension of said plate and oil from tank 132 is circulated around the injection cylinder in a manner similar to that shown in Fig. 7. The clamping and injecting head is reciprocated by the ram 133 which operates within the press head 121. The main pressing space 134 is above the piston 135 of the ram 133, while the push-back space is below this piston 135 around the plunger or ram 133. The booster action is effected by the provision of a stationary piston or booster ram 136 having an axial bore extending lengthwise thereof, the booster space being designated as 137.

The hydraulic and electrical circuits for the modified form illustrated in Fig. 14 are identical with those described above in connection with the main form of the invention and shown in Fig. 11. The same reference characters are applied to the hydraulic and electrical circuits in Fig. 14 as in Fig. 11. There are some differences and the mode of operation is somewhat different because in this modification the push-back and the main pressing operation operate on a common piston, namely piston 135, whereas in the main modification described above, the booster and push-back operate against common pistons while the main pressing takes place on pistons which are used only for this function. The main pressing space 134 is connected by a conduit 138 having a check valve 139 to the tank 140 so as to be able to withdraw liquid freely from the tank during a downstroke caused by the booster.

In the modified form, it is unnecessary to employ the two-way valve 111 described above because of the different arrangement of the booster, push-back and main pressing areas. Instead, an overtravel conduit 141 having a check valve 142 leads directly to the conduit 101 connected to the main pressing space 134. The single check valve 143 takes the place of the three check valves 37, 46 and 47 of Fig. 11. The conduit 38 having the check valve 39 leads from conduit 36 to conduit 101 and is adapted to be opened by the unloading valve 40 which is adapted to be actuated through the conduit 41 as before.

The operation of the modification of Fig. 14 will be obvious in view of the foregoing detailed description of the operation of the main embodiment. However, for purposes of completeness, it may be set forth briefly as follows:

With the press idling in the position shown in Fig. 14, the pump 62 is delivering pressure liquid into the conduit 64 whence it passes through valve 66 into conduit 103 leading to the booster area 137, and to valve 65 whence it is delivered into the conduit 105 leading to the push-back space 144. The main pressing space 134 is connected by valve 66 freely back to the tank 140, by way of conduits 108 and 107. The main ram 133 is held up because the push-back area is greater than the booster area. At the same time, the output of pump 62 is being constantly delivered into the clamping space above clamping pistons 128 by way of check valve 143 and conduit 36.

To start the main ram 133 downwardly, the operator closes switch 86. This energizes solenoids 67 and 81, solenoids 81 establishing a holding circuit as before for holding these solenoids energized and also establishing a connection between lines 80 and 83 preparatory for the operation of limit switch 77 by cam 78 carried by the clamping and injecting head 126. The energization of solenoid 67 causes the shifting of the valve member of valve 65 downwardly, thereby discontinuing the application of pressure to the push-back area 144. The main ram 133 is now moved downwardly at high speed under the action of the booster 136. When the mold halves are clamped, cam 78 closes limit switch 77, causing energization of solenoids 69 and 70. Energization of solenoid 70 causes the timing motors 89 and 92 to begin rotation and also causes the establishment of a holding circuit for holding solenoids 69 and 70 energized. Energization of solenoid 69 causes the valve member in valve 66 to be shifted upwardly, thereby cutting off the application of pressure to the booster space 137 and connecting the booster space freely back to the tank by way of conduits 109, 108 and 107. At the same time, the valve member in valve 66 causes the application of liquid pressure to the main pressing space 134. This causes the main ram 133 to continue downwardly. However, the clamping of the mold has been effected and clamping pistons 128 now unbottom, the liquid thereabove being forced through valve 40 and conduit 38 into the main pressing space 134, thereby increasing greatly the speed of injection. After a predetermined time, timing motor 89 opens its switch 88, causing de-energization of solenoids 67 and 81, causing valve 65 to shift so as to re-establish the application of liquid pressure to the push-back space 144. Since the push-back area plus the clamping area exceeds the main area, this causes the ram 133 to ascend in its return stroke. This ascension continues until pistons 128 bottom, whereupon the ram 133 stops. The apparatus maintains this state until timing motor 92 causes opening of switch 93, causing de-energization of solenoids 69 and 70, causing the valve member in valve 66 to resume the position shown in Fig. 14, causing the connection of the main pressing area to the tank 140 and causing the application of liquid pressure to the booster area 137 which is full because it was connected freely to the tank during the second portion of the down-stroke and during the first portion of the up-stroke. The shifting of valve 66 also cuts off the application of liquid pressure to the main pressing space 134 and consequently the ram 133 moves upwardly to complete its return stroke because the push-back area exceeds the booster area.

*Summary of operation of both embodiments*

The operation of the device may be summarized as follows:

(a) With the press idling, switch 86 is closed. This causes the application of pressure to the booster space, causing fast traverse and closing of the mold halves.

(b) When the mold halves close, the press head actuates limit switch 77. This causes the timing motors to start and also causes application of liquid pressure to the main pressing space. The main pressing pistons overcome the clamping pistons, causing the liquid squeezed out of the clamping space to enter the main space, causing injection at high speed.

(c) After completion of the injection stroke, the main pressing space is held under pressure until a predetermined time has elapsed, whereupon one of the timing motors (89) causes the application of pressure to the push-back space while continuing its application to the main pressing space and to the clamping space (which is under pressure at all times). This causes the first part of retraction while holding the mold halves closed, because the clamping area in conjunction with the push-back area exceeds the main area. This continues until the clamping pistons bottom.

(d) The clamping and injecting head stops when the clamping pistons bottom.

(e) After a predetermined time after the stopping of the head, the timing motor 92 causes the connection of the liquid pressure to the booster areas and causes the main areas to be connected to discharge. Since the push-back area is still connected to the liquid pressure, the push-back area overcomes the smaller booster area, the liquid squeezed out of the booster space being forced into the push-back space and causing a rapid final retraction. This completes the retraction and the cycle.

From the foregoing, it will be seen that the press of the present invention accomplishes the objects set forth at the outset in an efficient and satisfactory manner. It will be seen that the unique arrangement of opposed pressure areas aids greatly in bringing about these results. It will further be seen that the individual portions of the forward and return strokes are carried out at extremely high speed wherever this is advantageous. It will be seen, for example, that the provision of a relatively low booster area makes for a fast traverse preparatory to final clamping of the mold and the injection stroke. It will be seen that the connection of the clamping area so as to discharge into the main area makes for an injection stroke at very high speed. It will further be seen that the cooperation of clamping and push-back areas in overcoming the main area during the first part of the return is advantageous since it allows the injecting head to come to rest by the automatic cutting out of the clamping areas when the clamping pistons bottom, thus bringing the head to rest because the main area exceeds the push-back area. It is not necessary to have high speed during the first part of the return stroke because the mold cannot be unclamped until after a relatively long period of time. It will be seen that the provision for dwell of the injecting head at this point is accomplished in a unique manner by the timing motor 92. Finally, it will be seen that by having the opposed booster area and the push-back area simultaneously connected to receive the output of the pump that the final part of the return stroke is carried out at very high speed. Another advantage of the mechanism described herein is that it does not require an expensive accumulator system but allows the use of a single pump of limited output for the carrying out of the injection cycle in a minimum of time.

While it was not expressly referred to above, it will be understood that the pump 62 is shifted almost to neutral during the dwell at the end of the injection stroke, while the timing motor 89 is holding the clamping and injecting head at dwell, this shifting being accomplished automatically by building up of liquid pressure in conduit 64 and the transfer of this pressure through conduit 99 to the servomotor 100 of the pump 62. Thus the injection plunger is held under the injecting pressure.

While the invention has been described with particular reference to embodiments thereof which have been found to be very satisfactory, it is to be understood that the invention is not limited to these particular embodiments but that various modifications may be made therein to adapt the invention to various conditions and uses and that the invention is to be limited only as defined in the appended claims.

Having thus fully described my invention, what I claim as new and desire to secure by Letters Patent is:

1. Injection molding apparatus comprising a clamping and injecting head, main hydraulic motor means including a stationary cylinder and movable plunger for moving said head in a clamping and injecting stroke, push-back hydraulic motor means operatively connected with said head for effecting a retraction stroke of said head, clamping and cushioning hydraulic motor means carried by said head and having a cylinder connected to said head, and a piston movable in said cylinder, a movable mold half connected to the piston of said clamping and cushioning motor means, and booster hydraulic motor means associated with said main hydraulic motor means for traversing said head at high speed during the first portion of said stroke, the effective push-back area of said push-back motor means exceeding the effective area of said booster motor means, the effective advancing area of said main motor means exceeding the effective advancing area of said clamping and cushioning motor means, the affective advancing area of said clamping and cushioning motor means plus the effective push-back area of said push-back motor means exceeding the effective advancing area of said main motor means, and the effective advancing area of said main motor means exceeding the effective push-back area of said push-back motor means.

2. Injection molding apparatus comprising a clamping and injecting head, main hydraulic motor means having an advancing area for moving said head in a clamping and injecting stroke, push-back hydraulic motor means associated with said head and having a push-back area for returning said head, a movable mold half, and clamping and cushioning hydraulic motor means carried by said head and including a movable element connected to said mold half and provided with a fluid operable clamping area for clamping said movable mold half against another mold half, the advancing area of said main motor means exceeding the push-back area of said push-back motor means and also exceeding the clamping area of said clamping and cushioning motor means, and the combined push-back and clamping areas of said push-back motor means and said clamping and cushioning motor means exceeding the advancing area of said main motor means.

3. An injection molding machine comprising a clamping and injecting head, main hydraulic motor means having an advancing area for moving said head in a clamping and injecting stroke, push-back hydraulic motor means associated with said head and having a push-back area for returning said head, a movable mold half, clamping and cushioning hydraulic motor means carried by said head and including a movable element connected to said mold half and provided with a fluid operable clamping area for clamping said movable mold half against another mold half, said last-named motor means being adapted to normally project said mold half away from said head, the push-back area of said push-back motor means plus the clamping area of said clamping motor means exceeding the advancing area of said main motor means, the advancing area of said main motor means exceeding the push-back area of said push-back means, means for simultaneously applying common hydraulic pressure to all of said motor means for thereby causing said push-back motor means and said clamping motor means to return said head in opposition to said main motor means, means for thereafter rendering ineffective said clamping area for thereby causing said head to stop and for immediately rendering said clamping area effective should said main motor means move said head by overcoming said push-back motor means.

4. Injection molding apparatus comprising a clamping and injecting head, main hydraulic motor means having an advancing area for moving said head in a clamping and injection stroke, booster hydraulic motor means for rapidly traversing said head during the initial portion of said stroke, a movable mold half, clamping and cushioning hydraulic motor means carried by said head and having a clamping area for yieldingly urging said mold half away from said head, the advancing area of said main motor means exceeding the clamping area of said clamping motor means, means for applying a source of hydraulic pressure to said clamping motor means at all times, means for applying said source to said booster motor means to cause rapid traverse of said head and clamping of said mold half, means for thereafter applying said source to said main motor means for causing said main motor means to overcome said clamping motor means and cause an injection stroke, and means for simultaneously allowing discharge from said clamping motor means to said main motor means while maintaining said mold half clamped for thereby obtaining a more rapid travel of said head in said injection stroke.

5. Injection molding apparatus comprising a clamping and injecting head, a movable mold half, clamping and cushioning hydraulic motor means carried by said head for projecting said mold half away from said head, main hydraulic motor means for moving said head in a clamping and injecting stroke, push-back hydraulic motor means for returning said head, booster hydraulic motor means for rapidly traversing said head in the initial portion of said stroke, a source of hydraulic pressure, means for connecting said source to said clamping motor means at all times, means for connecting said source to said booster motor means to initiate said stroke, means for thereafter connecting said source to said main motor means to complete said stroke, means for thereafter connecting said source to said push-back motor means for thereby causing said push-back motor means in conjunction with said clamping motor means to overcome said main motor means to partially return said head, means for thereafter rendering said clamping motor means ineffectual for thereby causing said main motor means to overcome said push-back motor means and for thereby stopping said head in dwell, and means for thereafter disconnecting said main motor means from said source for thereby causing said push-back to complete said return.

6. Injection molding apparatus comprising a clamping and injecting head, main hydraulic motor means for actuating said head in an injection stroke, push-back hydraulic motor means for returning said head, a movable mold half, clamping and cushioning hydraulic motor means carried by said head and having a movable element for projecting said mold half away from said head in the direction of injection stroke, a source of pressure liquid, means for connecting said source to said clamping motor means at all times, means for moving said head to cause clamping, means for thereupon connecting said source to said main motor means to cause said head to execute an injection stroke and to telescope said clamping motor means, means operative after a predetermined time after completion of said stroke for connecting said source to said push-back motor means for causing said push-back and clamping motor means to overcome said main motor means and cause said head to execute a return stroke, stop means carried by said head for stopping the movable element of said clamping motor means and for thereby rendering said clamping motor means further ineffectual in said return for thereby stopping said head in its return stroke, and means operative after a predetermined time after said stopping for disconnecting said source from said main motor means for thereby causing said push-back motor means to complete said return stroke.

7. A vertical injection molding machine comprising a clamping and injecting head, an injection plunger projecting vertically downwardly from said head, means for vertically reciprocating said head, a stationary mold half, a vertical clamping and cushioning cylinder formed in said head, a fluid operable piston reciprocable in said cylinder, a movable mold half movably connected with said piston for cooperation with said stationary mold half, means carried by said head for limiting relative movement between said piston and said head in a direction in which said piston moves downwardly away from said head, an injection cylinder between said head and said mold halves, and lost motion means for connecting said injection cylinder to said head.

8. An injection molding machine comprising a reciprocable clamping and injecting head, clamping and cushioning hydraulic motor means carried thereby, and having associated therewith a movable element supporting a first mold half adapted to engage a second mold half, a movable injection cylinder between said head and said first mold half and adapted to engage the latter, an injection plunger carried by said head, a feeding screw carried by said cylinder, and means carried by said head for actuating said feeding screw in response to the travel of said head relative to said cylinder, when said mold halves engage each other.

9. An injection molding machine comprising a stationary mold half, a movable mold half operable to engage said stationary mold half, a movable injection plunger, a movable injection cylinder operable for engagement with said movable mold half, fluid operable motor means for sequentially moving said plunger and said cylinder in unison toward said stationary mold half and to telescope said plunger into said cylinder responsive to the engagement of said injection cylinder with said movable mold half, a feed hopper carried with said cylinder, a feed screw carried with said cylinder and adapted to deliver granular plastic from said hopper to said cylinder, a pinion rotatably connected with said screw, means for rotating said pinion in response to the telescoping of said plunger into said cylinder, said means including a rack for engagement with said pinion, and means for adjustably carrying said rack with said plunger.

10. Injection molding apparatus comprising a reciprocable injecting head, an injection plunger carried by said head and movable therewith, hydraulic motor means common to both said head and said injection plunger for reciprocating the same in unison, said injecting head comprising a cylinder having reciprocably mounted therein a fluid operable clamping plunger, a movable mold half operatively connected with said clamping plunger and adapted to be clamped thereby against a cooperating mold half, an injection cylinder between said movable mold half and said head for receiving said injection plunger, said cylinder being movable with respect to said mold halves and said injection plunger, and means hydraulically interconnecting said hydraulic motor means and said clamping plunger for causing the latter to assist the injecting movement of said injection plunger subsequently to the clamping together of said mold halves.

11. In a vertical injection molding press, a press bed adapted to support a first mold half, a stationary press head with a press cylinder mounted thereon, a main plunger reciprocable in said press cylinder and having associated therewith fluid operable advancing and retracting means for advancing and retracting said plunger, a clamping cylinder movable by said main plunger so as to move in unison with and in the same direction as said main plunger, a fluid operable clamping plunger reciprocably mounted in said clamping cylinder, a second mold half supported by said clamping plunger and adapted to be clamped thereby against said first mold half in response to relative movement between said clamping cylinder and said clamping plunger, while said mold halves engage each other, an injection plunger connected to said main plunger so as to be movable therewith for injecting molding material into said mold halves, and means responsive to a predetermined clamping pressure on said clamping plunger for conveying said pressure to said advancing means for aiding said main plunger in advancing said injection plunger during its injecting operation.

12. In a vertical injection molding press, a press bed housing a first fluid reservoir and a plurality of main cylinders, each of said cylinders having reciprocably mounted therein a fluid operable main plunger, a pressure fluid source for supplying pressure fluid to said main cylinders for actuating said main plungers, a movable press head supported by said main plungers and including a second fluid reservoir and a clamping cylinder, said press head being movable toward said press bed, connecting means for hydraulically connecting said fluid reservoirs and said cylinders respectively, a fluid operable clamping plunger reciprocably mounted in said clamping cylinder a first mold portion supported by said clamping plunger, a second mold portion supported by said press bed for engagement with said first mold portion, an injection plunger supported by said movable head for injecting molding material into said mold portions, and means responsive to a predetermined movement of said head toward said bed for conveying pressure fluid from said fluid source to said main cylinders to thereby cause said main plungers to move said head toward said bed for creating clamping pressure on said clamping plunger to clamp said mold portions together, and for causing said injection plunger to effect an injecting operation.

13. In a vertical injection molding press, a movable mold portion, a stationary mold portion, fluid operable means for advancing said movable mold portion toward said stationary mold portion, a fluid operable clamping plunger supporting said movable mold portion, fluid operable means for exerting hydraulic clamping pressure on said clamping plunger to clamp said movable mold portion against said stationary mold portion, an injecting plunger movable by said fluid operable means selectively in unison with or relative to said movable mold portion for injecting molding material into said mold portions, and means responsive to the advancement of said injecting plunger by said fluid operable means while said mold portions are clamped together for conveying clamping pressure from said clamping plunger to said fluid operable means to aid the advancing movement thereof.

14. An injection molding machine comprising a clamping and injecting head, a stationary mold half, a movable mold half, an injection plunger carried by said injecting head, hydraulic motor means for selectively moving said head toward or away from said stationary mold half, a movable injection cylinder carried with lost motion by said head and movable selectively in unison with said head or relative thereto, said cylinder being arranged for cooperation with said injection plunger and said movable mold half and being movable relative to both mold halves, and feeding means operable by said head on movement thereof relative to said cylinder for feeding molding material into said injection cylinder in proportion to said movement.

15. In an injection molding machine, a clamping and injecting head, an injection plunger carried thereby, an injection cylinder adapted to receive said plunger, a first mold half, a second mold half adapted to be engaged by said first mold half, clamping and cushioning fluid operable motor means carried by said head and including a clamping cylinder and a clamping piston connected to said first mold half and reciprocable in said clamping cylinder, fluid operable booster motor means for fast advancing said head to bring said mold halves into engagement with each other, fluid operable main hydraulic motor means responsible to the engagement of said mold halves with each other for continuing the advancing movement of said head to thereby cause said piston to move relative to its cylinder for exerting clamping pressure on said mold halves to clamp them together, and means for conveying said clamping pressure to said main hydraulic motor means for assisting the latter in the advancing operation of said head.

16. In an injection molding machine, a stationary mold half, a movable mold half for cooperation with said stationary mold half, an injection cylinder for receiving material to be ejected therefrom into said mold halves, a reciprocable injection plunger for ejecting material from said cylinder into said mold halves, said movable mold half being arranged between said injection plunger and said stationary mold half, a fluid operable clamping cylinder-piston-assemly for clamping said mold halves together, and fluid operable main motor means operatively connected with said clamping cylinder-piston-assembly and operable to actuate said clamping cylinder-piston-assembly for clamping said mold halves together and subsequently to actuate said injection plunger for ejecting material from said injection cylinder into said mold halves.

WARREN R. TUCKER.